I. L. & F. M. LEASURE.
RAIL JOINT.
APPLICATION FILED JUNE 22, 1909.
952,264.
Patented Mar. 15, 1910.
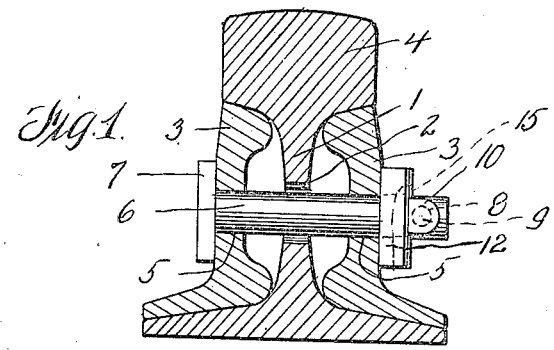
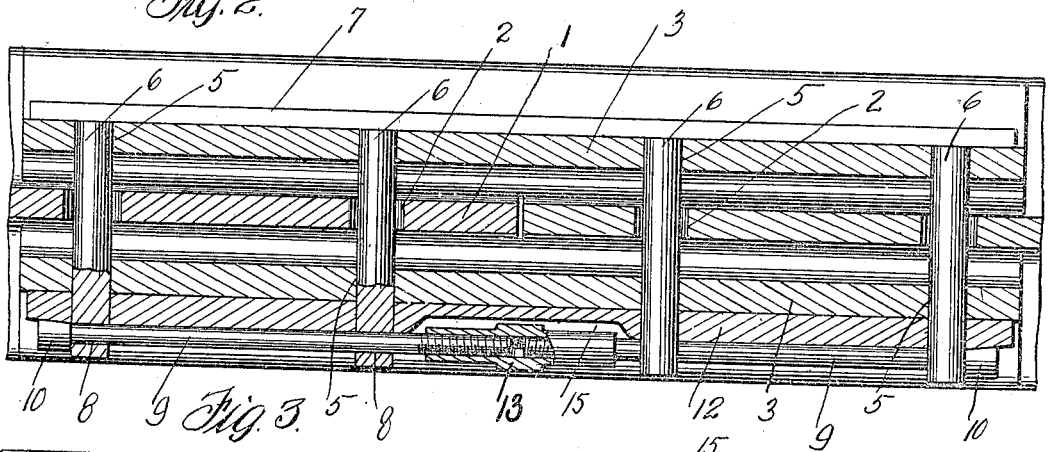
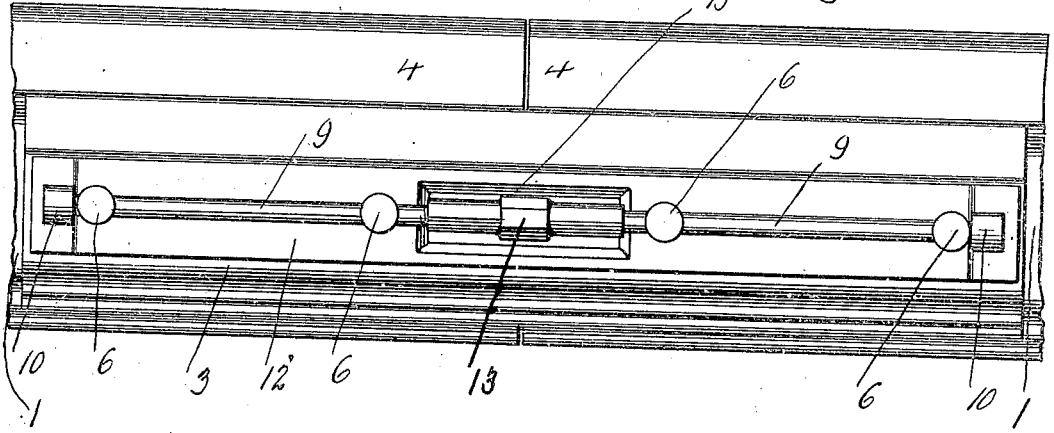
Witnesses
Samuel Payne
R. H. Fuller
Inventors
I. L. Leasure.
F. M. Leasure.
By H. C. Evert & Co.
Attorneys.

UNITED STATES PATENT OFFICE.

IRA LESSUP LEASURE AND FRIEND M. LEASURE, OF TEMPLETON, PENNSYLVANIA, ASSIGNORS OF ONE-THIRD TO JACOB MERWINE, OF PINE TOWNSHIP, ARMSTRONG COUNTY, PENNSYLVANIA.

RAIL-JOINT.

952,264.  Specification of Letters Patent.  Patented Mar. 15, 1910.

Application filed June 22, 1909. Serial No. 503,614.

*To all whom it may concern:*

Be it known that we, IRA LESSUP LEASURE and FRIEND M. LEASURE, citizens of the United States of America, residing at Templeton, in the county of Armstrong and State of Pennsylvania, have invented certain new and useful Improvements in Rail-Joints, of which the following is a specification, reference being had therein to the accompanying drawing.

This invention relates to rail joints, and the invention has for its primary object the provision of simple and effective means for holding splice bars in engagement with the confronting ends of two rails, whereby said rails cannot become accidentally displaced, by the stress and strains to which the rails are subjected by rolling stock passing over the same.

Another object of the invention is to provide a strong and durable rail fastener that can be easily and quickly placed in position without the use of skilled labor.

With the above and other objects in view, reference will now be had to the drawing forming a part of this specification, wherein there is illustrated a preferred embodiment of the invention, but it must be understood that the structural elements thereof can be varied or changed without departing from the spirit of the invention.

In the drawings:—Figure 1 is a cross sectional view of the rail joint, Fig. 2 is a horizontal sectional view of the rail joint, and Fig. 3 is a side elevation of the rail joint.

In the drawings we have illustrated the confronting ends of two rails as having the web portions 1 thereof provided with openings 2.

3 denotes splice bars of the ordinary and well-known type, said splice bars bracing the webs 1 and supporting the heads 4 of the rails. The splice bars 3 are provided with openings 5 transversely alining with the openings 2 of the rails.

6 denotes bolts adapted to extend through the openings 5 and 2. These bolts are formed integral with an oblong connecting head 7, and the opposite ends of said bolts are provided with longitudinally alining openings 8.

9 denotes screws having heads 10 and which constitute duplex connecting means, one of said screws having right hand screw threads and the other screw left hand screw threads. These screws extend through the openings 8 of the bolts 6 toward one another, whereby the threaded ends of said screws will confront to permit of a coupling nut being screwed upon the screws to draw the screws toward one another. Prior to placing the screws in position a spacing block 12 is mounted upon the ends of the bolts 6, and this block intermediate the ends thereof is cut away or recessed, as at 15 to provide clearance for the coupling nut 13, which serves as a turn-buckle.

It is apparent that the various parts of the rail fastener can be readily assembled to form a rigid connection between the confronting ends of the rails.

Having now described our invention, what we claim as new is:—

1. In a rail joint, the combination with the confronting ends of rails, said rails having the web portions thereof provided with openings, and splice bars bracing said rails and having openings alining with the openings of said rails, of bolts extending through the openings of said splice bars and rails, an integral oblong head connecting said bolts and engaging one of said splice bars, a spacing block mounted upon said bolts and engaging the other of said splice bars, longitudinal screws extending through transverse openings in said bolts, and a coupling nut connecting the confronting ends of said screws.

2. In a rail fastener, the combination with rails, and splice bars bracing said rails, of bolts extending through said splice bars and said rails, an integral head connecting said bolts and engaging one of said splice bars, a spacing block mounted upon said bolts and engaging the other of the splice bars, duplex connecting means extending through the bolts and having the inner ends thereof opposing each other and the outer ends headed, and means for coupling the opposing ends of the connecting means together.

In testimony whereof we affix our signatures in the presence of two witnesses.

IRA LESSUP LEASURE.
FRIEND M. LEASURE.

Witnesses:
LAWRENCE WALKER,
FRANK L. HEASLEY.